124,827

UNITED STATES PATENT OFFICE.

LE GRAND KNIFFEN, OF WORCESTER, MASSACHUSETTS.

IMPROVEMENT IN PRESERVING CRANBERRIES.

Specification forming part of Letters Patent No. 124,827, dated March 19, 1872.

*To all whom it may concern:*

Be it known that I, LE GRAND KNIFFEN, of the city and county of Worcester and Commonwealth of Massachusetts, have invented a certain new and useful Improved Process of Preparing Cranberries for Preservation and Shipment; and I do hereby declare the following to be a full, clear, and exact description thereof, sufficient to enable others skilled in the art to which my invention belongs to practice and use the same.

It is well known that the cranberry is a very delicious and healthful fruit, and one which contains elements that peculiarly adapt it for use as an accessory to army and shipping supplies, provided it can be prepared in such a manner that it will retain its quality and flavor for an unlimited period. This has heretofore been found difficult to accomplish, as the berries, although a lasting fruit, will, when whole, rot before they can dry, and when mashed and dried they form an insoluble and worthless mass, unless mixed with some other material, which prevents their use for any purpose in which cranberries alone are desired.

I have discovered from experiments that when cranberries are sliced or carefully cut up into small sections or pieces that they can be readily dried; and, hence, my process for preparing them is to slice or cut up the berries, and after cutting them to thoroughly dry them, when they can be packed in tight cans for shipment; or, if preferred, the dried berries can then be condensed into a solid mass by means of properly applied pressure, thus lessening their bulk to such an extent that a large amount of fruit can be contained within a very small space. One quart of fresh berries will, when cut and dried, be reduced to about one-fourth of their former size, and, when pressed or condensed, to about one-third of their bulk after being dried. The cranberries when thus prepared can be readily and conveniently shipped, and will remain in good condition for a very long time.

When used a sufficient quantity of water is added to them and they are allowed to soak until they become soft, after which they may be cooked or used in the same manner as the fresh fruit.

The berries can be sliced or cut by proper machinery, whereby the operation can be very rapidly performed; and they may be dried in suitable kilns or by the sun and air.

Having described my improved process, what I claim therein as new and of my invention, and desire to secure by Letters Patent, is—

1. The process of preparing cranberries for preservation and shipment, substantially as above described.

2. As a new article of manufacture, cranberries preserved, substantially in the manner herein described.

LE GRAND KNIFFEN.

Witnesses:
CHAS. H. BURLEIGH,
A. E. PEIRCE.